United States Patent Office 3,418,565
Patented Dec. 24, 1968

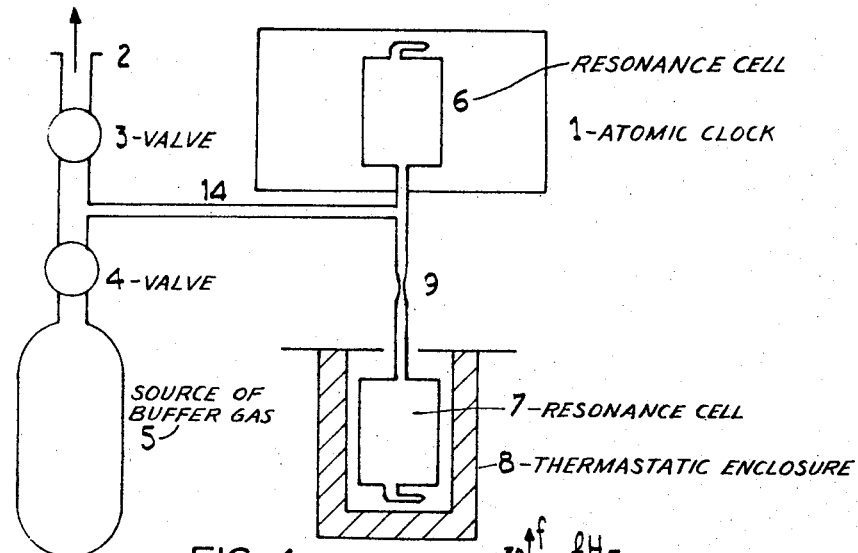
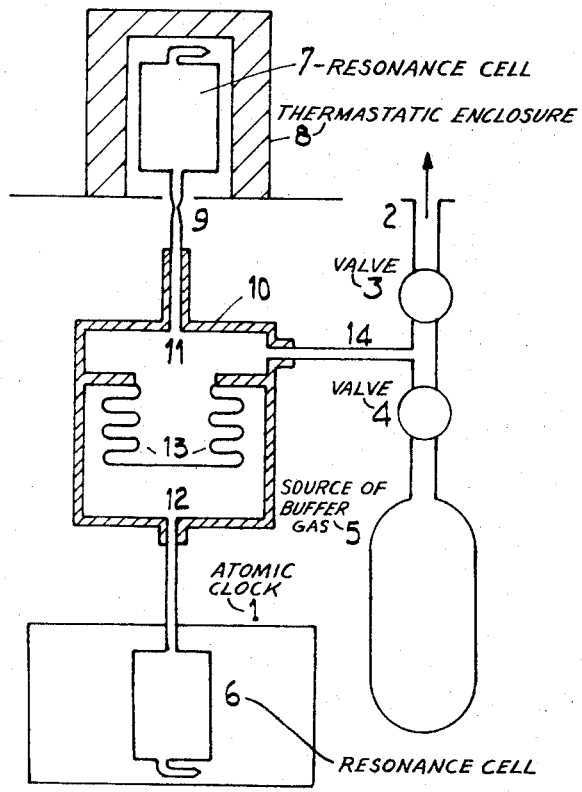
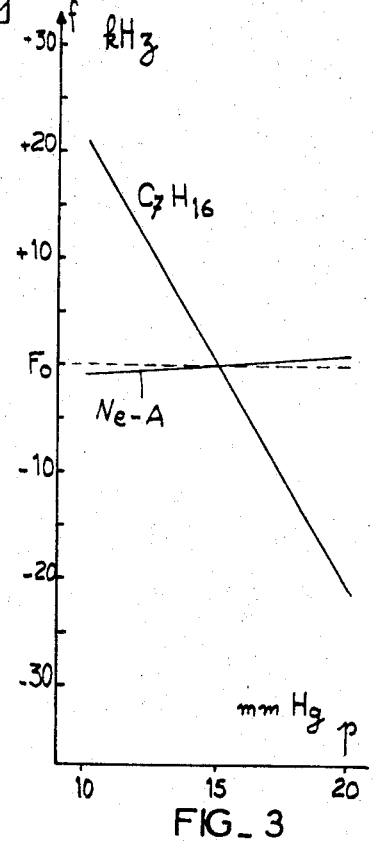
FIG_1
FIG_2
FIG_3

3,418,565
OPTICAL RESONANCE CELLS
Georges Broussaud and Leon Malnar, Paris, France, assignors to CSF—Compagnie Generale de Telegraphie Sans Fil, a corporation of France
Filed July 12, 1966, Ser. No. 564,572
Claims priority, application France, July 22, 1965, 25,643
6 Claims. (Cl. 324—.5)

The present invention relates to optical resonance cells.

An optical resonance cell encloses inside a sealed glass vessel an alkali vapour and an inert gas, whose presence makes it possible to reduce the influence of the Doppler effect on the resonance line characteristic of the alkali vapour concerned. The interaction between alkali and inert atoms causes, however, a displacement of this resonance line whose amplitude varies as a function of the pressure in the vessel during the filling.

In order to obtain the desired resonance frequency at the operating temperature, one must know accurately the filling pressure at the moment when the vessel is sealed. This pressure can be measured with known means with an accuracy of a few thousandths, but this value is reduced by associated uncontrollable phenomena to some hundredths. This is fully insufficient, if the resonance frequency of an optical pumping cell is to be trimmed to within $10^{-10}$, because, as is well known, the filling with buffer gas must be controlled by a measuring system with an accuracy 100 times higher.

It is an object of this invention to provide an accurate system for controlling the filling pressure of an optical resonance cell.

According to the invention, there is provided a system for controlling the filling pressure of an optical resonance cell comprising inside a glass vessel an alkali vapour and a buffer gas, said system comprising: means for feeding said buffer gas to said cell; a further cell; means for equalizing the pressure in said cells; means for measuring the resonance frequency of said further cell; and thermostatic means for maintaining said first mentioned cell at its working temperature.

For a better understanding of the invention and to show how the same may be carried, into effect, reference will be made to the drawing accompanying the following description and in which:

FIG. 1 shows a first embodiment of the invention;
FIG. 2 shows another embodiment of the invention; and
FIG. 3 is an explanatory diagram.

The frequency of a resonance line of a cell containing an optically pumped alkali vapour depends on the pressure of the buffer gas introduced therein to reduce the Doppler effect which tends to widen the resonance line.

This dependence on the pressure is connected with the nature of the buffer gas whose atoms interact with those which are brought to atomic resonance. It is expressed by means of a coefficient which measures the drift $\Delta f$ of the resonance frequency in cycles for an internal pressure change equal to 1 cm. Hg Bender and Beaty, in Physical Review Letters, vol. 1, No. 9, of November 1958, have found the following results:

| Gas: | $\Delta f$ c./s./cm.-Hg |
|---|---|
| Neon | 3920±140 |
| Argon | −510±10 |
| Methane | −5,000 |
| Heptane | −42,000 |

These shifts of the resonance line as a function of the pressure correspond to frequency drifts as a function of the temperature, but by using a suitable mixture, such as 55 percent Ne-45 percent A, the temperature effects can be compensated. However, even with the latter mixture, there exists nevertheless a frequency drift which is a function of the pressure and amounts to 1926.5 c./s. per cm. of mercury. This must be taken into account during the filling of the resonance cell, so that the frequency obtained under normal operating conditions should be the desired frequency.

According to the invention, the control of the filling of the cell is effected by means of a control atomic clock whose resonance cell is coupled to the cell to be filled.

FIG. 1 shows an atomic clock 1 comprising a resonance cell 6 connected to an intake conduit 14, to which the resonance cell 7 to be filled is also connected. Valves 3 and 4 enable the conduit 14 to be connected to a buffer gas tank 5 and an orifice 2 communicating with high vacuum. A thermostatic enclosure 8 maintains the cell 7 at the working temperature which is that of the atomic clock 1.

The introduction of the buffer gas is controlled by the action of the valves 3 and 4. The frequency of the atomic clock varies as a function of the pressure existing simultaneously in the two resonance cells. When the frequency of the atomic clock reaches the desired value, the pressure of the buffer gas has the desired value and the neck 9 of the cell 7 may be sealed.

FIG. 2 shows a modification of the filling arrangement according to the invention; the same reference numerals indicate the same members as in FIG. 1, but in addition, a tank 10 with two compartments 11 and 12 has been provided. The two compartments are separated by a flexible and impermeable diaphragm.

For amplifying the frequency drift resulting from changes in the pressure during the filling, the cell 6 and the compartment 12 contain buffer gas, such as heptane, which has a frequency drift coefficient $\Delta f$ which is much greater than that of the buffer gas normally used in the cell 7 and filling the compartment 11. Under the effects of the pressure variations resulting from the supply made through the valves 3 and 4, the diaphragm 13 is displaced and changes the volume of the compartment 12 until the pressures on either side are substantially equal. For a given change in the pressure of the buffer gas, the frequency of the clock undergoes a much greater change than would be the case with the normal buffer gas.

FIG. 3 shows the curves for the resonance frequency variation for the normal Ne-A mixture usable in the cell 7 and for the heptane buffer used, by way of example, in the cell 6 of the control clock 1.

For calibrating the arrangement of FIG. 2, a series of resonance cells is made, containing a normally used buffer gas, for example, the neon-argon mixture, at slightly different pressures. The frequencies of these cells are measured with a heptane control clock, and then the frequencies of a test clock in which the resonance cells are successively placed are measured. Each pair of frequencies is plotted on a diagram, the frequencies of the heptane clock on the abscissa and those of the normal clock along the ordinate. The curve joining the points is the curve of the required calibration.

All measurements of frequency drifts are carried out by means of a beat method, which is very accurate, by means of a reference clock. In view of the high frequency stability of these clocks, the adjustment of the filling pressure of the cells may be made with an error in frequency not exceeding one cycle per second.

Of course, the resonance cells may be used in atomic clock as well as in any optical pumping devices, and in particular in magnetometers.

What is claimed is:
1. A system for controlling the filling pressure of a first optical resonance cell comprising inside a glass vessel an alkali vapour and a buffer gas, said system comprising: means for feeding said buffer gas to said first cell; a second optical resonance cell containing an alkali vapor and a buffer gas; pressure transmitting means interconnecting said cells for equalizing the pressure in said cells; means for producing resonance in said second cell and for measuring the resonance frequency of said second cell to thereby obtain a measure of the equalized buffer gas pressures in said interconnected cells; and thermostatic means for maintaining said first mentioned cell at its working temperature.

2. A system as claimed in claim 1, comprising a duct interconnecting said cells.

3. A system as claimed in claim 1, wherein said measuring means are an atomic clock incorporating said further cell.

4. A system as claimed in claim 1, wherein said pressure equalizing means comprise an enclosure having a first and a second chamber and a flexible, gas tight diaphragm separating said chambers from each other; said first chamber connected to said first cell and said buffer gas feeding means; said second chamber connected to said second cell.

5. A system as claimed in claim 4, wherein said second cell includes a buffer gas providing a frequency drift substantially higher than that produced by the buffer gas in said first cell in response to an increase in pressure.

6. A system as claimed in claim 5, wherein said buffer gas in said second cell is heptane.

References Cited
UNITED STATES PATENTS 2,955,262   10/1960   Arditi _____ 331—3
3,242,423   3/1966   Malnar _____ 324—0.5

RUDOLPH V. ROLINEC, *Primary Examiner.*

M. J. LYNCH, *Assistant Examiner.*

U.S. Cl. X.R.

331—94